United States Patent Office 3,102,103
Patented Aug. 27, 1963

3,102,103
PERFLUOROALKYL ACRYLATE POLYMERS AND PROCESS OF PRODUCING A LATEX THEREOF
Arthur H. Ahlbrecht, Dellwood, and Samuel Smith, Roseville, Minn., assignors to Minnesota Mining and Manufacturing Company, St. Paul, Minn., a corporation of Delaware
No Drawing. Continuation of application Ser. No. 677,229, Aug. 9, 1957. This application Apr. 23, 1963, Ser. No. 274,920
8 Claims. (Cl. 260—29.6)

This invention relates to new and useful perfluoroalkyl acrylate and methacrylate polymers; to aqueous latexes thereof suitable for treating fibrous materials to render them oleophobic (oil repellent); and to fabrics and fibers which have been sized or coated with such polymers so as to have been rendered oil repellent.

This application is a continuation of our copending application Serial No. 677,229, filed August 9, 1957.

The new polymerizable monomeric esters used in making these polymers can be represented by the general formula:

$$R_f{-}(CH_2)_m{-}O{-}CO{-}\overset{R}{\underset{}{C}}{=}CH_2$$

wherein R is hydrogen or a methyl radical, $R_f$ is a perfluoroalkyl group having from 3 to 12 carbon atoms and $m$ is an integer from 3 to 12.

It has been found that esters of terminally perfluorinated alcohols in which a chain or bridge containing at least three methylene groups is interposed between the perfluoroalkyl "tail" and the hydroxyl group possess unusual properties. The acrylate and methacrylate esters of these alcohols can be polymerized to produce polymers which are particularly suited for rendering cloth and other fibrous materials both hydrophobic and oleophobic. Such alcohols are disclosed and claimed in the application of one of us (Arthur H. Ahlbrecht), S.N. 247,357, filed December 26, 1962, as a continuation-in-part of the present application and of application S.N. 664,911, filed June 11, 1957.

The useful ω-perfluoroalkyl-substituted acrylate esters of the invention can be produced by interreaction of the selected perfluoroalkyl alkanol and acrylic or methacrylic acid. The intermediate perfluoroalkyl alkanols are prepared by reduction of halogenated perfluoroalkyl alkanols produced by desulfonylative addition of perfluoroalkanesulfonyl chlorides to unsaturated alkanols such as allyl alcohol and homologs thereof, as shown in the following equations:

$$R_fSO_2Cl + CH_2{=}CH{-}CH_2OH \xrightarrow{catalyst}$$

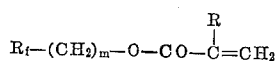

$$R_fCH_2{-}CHCl{-}CH_2OH \xrightarrow[\text{nickel, } H_2,\text{NaOH}]{\text{Raney}} R_fCH_2{-}CH_2{-}CH_2OH$$

Other analogous addition reactions of perfluoroalkanesulfonyl halides to unsaturated esters and acids, as described in the copending application of G. V. D. Tiers, S.N. 532,743, filed September 6, 1955, now Patent No. 2,965,659, followed by reductive dehydrohalogenation, also lead to the intermediate perfluoroalkyl alkanols of the present invention, either by further saponification of the resulting esters or by reduction of the corresponding distally perfluoroalkylated aliphatic acids or esters thereof using, for example, lithium aluminum hydride. These reactions are illustrated by the following equations:

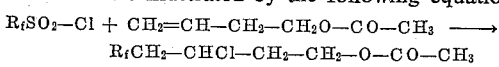

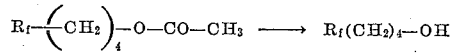

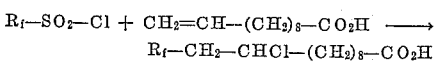

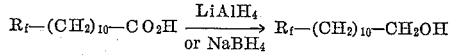

Suitable perfluoroalkyl-substituted alkanols for use in preparing the monomers of the invention are exemplified by 3-(perfluorooctyl)propanol, 12-(perfluorobutyl)dodecan-1-ol, 6-(perfluorodecyl)hexan-1-ol, 5-(perfluoropropyl)pentan-1-ol, 12-(perfluorododecyl)dodecan-1-ol, 7-(perfluorooctyl)heptan-1-ol and the like. When esterified with acrylic acid or methacrylic acid, the acrylate and methacrylate esters, respectively, of the corresponding alcohols are obtained.

The monomers of the invention are readily polymerized by the methods known to the art, for example by bulk polymerization, solution polymerization and emulsion polymerization, using catalysts such as benzoyl peroxide or other free radical polymerization initiators.

Preparation of polymers and vulcanized rubbers from such monomers is set forth more fully in the following specific examples which it is to be understood are for purposes of illustration only. These polymers, including both homopolymers and copolymers prepared from these monomers, are characterized by the presence in the skeletal chain of repetitive or recurring units which can be represented as follows:

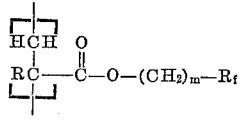

wherein $R_f$, R and $m$ have the significance set forth hereinabove. The homopolymer contains these repetitive units attached to one another by the valence bonds shown unattached in the above formula; copolymers can contain these groups interspersed with groups derived from ethylenically unsaturated monomers, for example, vinyl type monomers such as vinyl chloride, vinyl stearate, styrene; butadiene; and the like. When fibers are coated with these homopolymers or with their copolymers the perfluoroalkyl "tail" is apparently preferentially exposed on the outer surface of the fiber, thereby imparting oil resistance and water resistance to the fibers whether in the form of a woven fabric or cloth, or in the form of a random web as in paper or felt.

EXAMPLE 1

*Preparation of 3-(Heptadecafluorooctyl)-Propyl Acrylate*

In a 100 ml. round bottomed flask fitted with thermometer well bearing a thermometer and a reflux head comprising a 12 in. long by about ½" diameter fractionating column packed with glass helices and surmounted by a Barrett trap and reflux condenser were placed 35 g. of benzene, 0.3 g. para-toluene sulfonic acid, 0.2 g. of hydroquinone, 2.88 g. (0.04 mole) of acrylic acid and 19.1 g. (0.04 mole) of 3-(heptadecafluorooctyl)-propyl alcohol. The flask was heated at about 82–83° C. so that the refluxing benzene carried water into the Barrett trap as rapidly as formed. After about 4 hours, a total of 0.72 ml. of water, approximately the theoretical amount, had collected and no more appeared to be removed by the benzene vapors. Benzene was removed by distillation until the temperature in the flask was about 95°. Heating was then stopped and the remaining solvent was removed by application of an aspirator with intermittent swirling and warming to avoid excessive heating of the product. The residue was taken up in about 25 ml. of ether and washed first with 10% aqueous sodium hydroxide to remove unreacted acrylic acid and the toluenesulfonic acid and thereafter with a few cc. of water to remove alkali. The residue was transferred to a flask for vacuum distillation, about 0.1 g. of hydroquinone was added and ether was removed under vacuum and the residue finally distilled at 0.02 mm. pressure. The fraction boiling at 72–76° at 0.02 mm. pressure weighed 16.0 g. It was dissolved in ether and filtered to remove a small amount of polymer, washed with a small amount of 10% aqueous sodium hydroxide to remove hydroquinone and evaporated to give a residue of 12.5 g. of viscous, virtually colorless, low melting 3-(heptadecafluorooctyl)-propyl acrylate having $n_D^{25}=1.3421$.

Calculated: C=31.5%; F=60.6%. Found: C=31.3%; F=59.9%.

3-(heptadecafluorooctyl)-propyl acrylate was bulk polymerized by adding 0.003 g. of benzoyl peroxide to 0.6 g. of monomer and heating at 50° C. for 2.5 hours. The polymer was a rather tough rubber.

Emulsion polymerization of 2 g. of 3-(heptadecafluorooctyl)-propyl acrylate in 3.6 g. of 60:40 water:methanol using 0.1 g. potassium 11-perfluorooctyl-hendecanoate as an emulsifier and 0.01 g. potassium persulfate as a catalyst at 50° for about 15 hours gave about 68% conversion to polymer. The resulting clear blue latex (Latex I) contained no precoagulum. The polymer had an inherent viscosity in 1:2 acetone-methyl perfluorobutyrate of 0.35.

A similar polymerization was carried out at 50° C. for about 17 hours employing 5 g. of the above monomer in 9 g. of 70:30 water-acetone and 0.25 g. of potassium N-ethyl-2-(perfluorooctane sulfonamido)-acetate as an emulsifier and 0.025 g. potassium persulfate as catalyst. The latex (Latex II) which formed was blue but slightly cloudy owing to a trace of precoagulum. The isolated polymer (82% conversion) was rubbery and had an inherent viscosity in 1:2 acetone-methyl perfluorobutyrate of 0.40.

The two latices (hereinafter designated respectively I and II) thus prepared were tested as in treatments for both cotton and Visa cloth. Visa is the trade name of Deering-Milliken and Co., Inc. for a fabric consisting of a blend of 45% wool and 55% polyethylene terephthalate fibers. Seven by seven inch squares of the respective cloths were treated by padding thereon the respective emulsions diluted to 1% solids with water so that about 1% of polymer (based on fabric weight) was present in the fabric. The four specimens thus obtained were dried 10 minutes at 140° C. and tested for resistance to water and oil.

Hydrophobic properties of the treated cloth were determined by Method 22–52 of the American Association of Textile Chemists and Colorists and described, for example, on pages 136 to 138, inclusive, of the Technical Manual and Yearbook of that association for the year 1954. It is to be noted that this method provides for no interpolation of results which are reported as one of the Standard Spray Test ratings which are the six ratings 0, 50, 70, 80, 90 and 100.

Oleophobic properties were measured by means of ratings assigned on the basis of resistance for 3 minutes to drops of oil-turpentine mixtures varying by 10% increments from pure mineral oil (Nujol, Stanolind, etc.) to pure turpentine applied gently to the surface of the textile maintained level and are indicated by numerals 0 to 10 respectively for the mixture of highest turpentine content which fails to penetrate. Thus the numeral 5 indicates a mixture of 50% of each of the two components. Interpolation is judged visually and indicated where significant by means of plus (+) or minus (−) signs.

The above specimens of fabric treated with the two latices were tested with the results shown in Table I.

TABLE I

| Latex | Cloth | Spray rating | Oil Repellency Rating |
| --- | --- | --- | --- |
| I | Cotton | 50 | 3–7 |
| I | Visa | 80 | 10 |
| II | Cotton | 50 | 10 |
| II | Visa | 70 | 10 |

These repellency properties on Visa are not lost on repeated dry cleaning.

EXAMPLE 2

*Preparation of 11-(Heptadecafluoro-Octyl)-Undecyl Acrylate and Methacrylate*

This ester was prepared by substantially the procedure used in the preparation of its lower homolog in Example 1 from 15 g. (0.0254 mole) of the corresponding alcohol and 2 g. (0.028 mole) of acrylic acid in the presence of 0.5 g. each of p-toluene sulfonic acid and hydroquinone, refluxing and distilling water from the reaction mixture into a Barrett trap over a period of about 6 hours. The cooled reaction mixture was diluted with ether, filtered to remove insoluble material, and washed with 10% sodium hydroxide to remove acidic and phenolic materials. The organic solution was dried. Solvents were removed under vacuum to leave a residue of 12 g. of a solid ester having the expected composition as shown by infra-red absorption spectrum and a melting point of about 28–36° C.

The methacrylate ester was prepared by a similar reaction using the equivalent amount of methacrylic acid. It was a tan, pasty solid melting at about 23–27° C.

Bulk polymerization of the acrylate ester gave a cross-linked polymer. Latices were prepared from the acrylate and methacrylate esters by emulsion polymerization using 5 g. of monomer in 9 g. of 70:30 acetone:water containing 0.25 g. of potassium N-ethyl-2-(perfluorooctane-sulfonamido)-acetate as emulsifier and 0.025 g. of potassium persulfate as a catalyst, by heating under a nitrogen atmosphere at 50 C. for about 16 hours with agitation. The latices were slightly tan-colored with some precoagulum. The real conversion to the polymers from the monomeric acrylate and methacrylate esters were respectively 96% and 86% and inherent viscosities in 1:2 acetone-methyl perfluorobutyrate were respectively 0.14 and 0.12.

The latices from the acrylate and methacrylate esters (hereinafter designated as Latex III and Latex IV respectively) were employed to treat cotton and Visa cloth by the method described in Example 1. The results of tests for water and oil resistance (performed as before on the treated specimens are shown in Table II).

TABLE II

| Latex | Cloth | Spray Rating | Oil Repellency Rating |
| --- | --- | --- | --- |
| III | Cotton | 70 | 4.5 |
| III | Visa | 100 | 7 |
| IV | Cotton | 70 | 7 |
| IV | Visa | 100 | 10 |

EXAMPLE 3

*Preparation of 3-(Heptafluoro-Propyl)-Propyl Acrylate*

This ester was prepared by substantially the procedure used in the preparation of other acrylates but using a greater excess of acrylic acid. A mixture of 9.0 g. (0.04 mole) of the alcohol and 7.2 g. (0.1 mole) of acrylic acid in 10 g. of benzene with 0.3 g. of p-toluene sulfonic acid and 0.2 g. of hydroquinone was refluxed and the water (about 0.8 ml.) collected in a Barrett trap for about 3 hours. The material was distilled to remove benzene and the residue taken up in ether and washed first with 3% sodium hydroxide to remove excess acid, catalyst and hydroquinone and then with water. The neutral ethereal solution was fractionally distilled through a Vigreaux column equipped with heating mantle to promote more efficient operation and, after initially removing either and a forerun boiling at 71–75°/10 mm., 9 grams of 3-(heptafluoropropyl)-propyl acrylate were collected at 75–76°/10 mm., which showed the expected infrared absorption maxima and had $n_D^{23} = 1.3562$.

Emulsion polymerization of 4 g. of this monomeric acrylate ester was carried out in 7.2 g. of water containing 0.13 g. of sodium lauryl sulfate and .01 g. of potassium persulfate heated with agitation for 5 hours at 50° C. followed by freezing to coagulate the polymer. The white, rubbery polymer was separated, washed and dried and had inherent viscosity in 2:1 acetone:methyl perfluorobutyrate of 2.3. The rubber was cured by blending 100 parts of polymer with 6.72 parts of sodium silicate nonahydrate and 2.72 parts calcium hydroxide followed by heating at 310° F. in a press at 900 pounds pressure for 20 hours. A rubbery elastomer showing good resistance to oils was obtained, which, when prepared in sheet form, was useful for preparing gaskets, cap liners and the like.

The cured rubber showed a flexing resistance tenfold that at room temperature ($T_{10}$) of −11° as determined by ASTM Procedure D1053–54T. It was tested for solvent resistance by ASTM Procedure D471–54T and showed the following:

| Solvent: | Volume percent swell |
|---|---|
| Acetone | 250 |
| Benzene | 65 |
| 70:30 isooctane:toluene | 65 |
| Dioctyl sebacate hydraulic fluid (penola oil) | 15 |

Tensile strength and elasticity were measured by the usual stretching methods. There was 100% elongation at 361 pounds per square inch cross-section and 200% at 470 p.s.i. Break occurred at 482 p.s.i. at which point there was 260% elongation and a permanent deformation of 18%.

EXAMPLE 4

*Preparation of 3-(Heptafluoropropyl)-Propyl Methacrylate*

Into a round-bottomed flask fitted with stirrer, dropping funnel and reflux condenser and resting in an ice bath were placed 200 cc. of anhydrous diethyl ether, 10.1 g. (0.10 mole) of triethylamine and 22.8 g. (0.10 mole) of 3-(heptafluoro propyl)-propyl alcohol. The mixture was stirred and cooled to about 5 to 10° C. and 10.4 g. (0.10 mole) of methacrylyl chloride were added slowly over about ten minutes. About 0.2 g. of hydroquinone was added to act as a polymerization retarder and the flask was stoppered and allowed to stand overnight (about 18 hours). The mixture was worked up by adding 200 cc. water to dissolve the precipitated triethylamine hydrochloride and the ether layer was separated, and distilled under reduced pressure. The lower layer of the residue remaining weighed 27 g. It was distilled under reduced pressure in a conventional vacuum distillation apparatus to give two fractions, the second of which was 3-(heptafluoro propyl)-propyl methacrylate, boiling point 70–73° C./10 mm.; $n_D^{25} = 1.3636$. The yield was 15.5 g. Found: C, 40.2%; F, 45.0%. Calculated: C, 40.5%; F, 45.0%.

Emulsion polymerization of this monomer was effected using 100 parts of monomer in 180 parts of water containing 5 parts of dodecylamine hydrochloride as emulsifier and 0.5 part of potassium persulfate as a catalyst, with shaking for about 15 hours at 50° C. The bluish latex thus obtained was employed at 1% polymer solid concentration for the treatment of samples of cotton and Visa cloth as above. The treated cloths rated 80 for water repellency. Treated Visa cloth showed significant oil repellency.

EXAMPLE 5

*Preparation of 5-(Heptadecafluorooctyl)-Pentyl Methacrylate*

5-(heptadecafluorooctyl)-pentanol (prepared by reaction of perfluorooctanesulfonyl chloride and pent-4-en-1-ol in the presence of ditertiary butyl peroxide and subsequent catalytic dehydrohalogenation) was esterified with methacrylic acid by the procedure described in Example 4. The 5-(heptadecafluorooctyl)-pentyl methacrylate thus prepared was distilled and found to boil at 102–104°/0.1 mm. pressure.

Found: C, 35.3%; F, 55.7%. Calculated: C, 35.6%; F, 56.3%.

This monomer was emulsion-polymerized by heating at 50° C. for 17 hours a mixture of 100 parts of monomer, 126 parts of water, 54 parts of acetone, 0.5 part of potassium persulfate and 5 parts of potassium N-ethyl-2-(perfluorooctanesulfonamido)-acetate as an emulsifier. The clear blue latex contained some precoagulum and 34.0% polymer solids. The inherent viscosity of the polymer in 1:2 acetone-methyl perfluorobutyrate was 1.06 at 25° C.

The latex was diluted to 1% polymer solids and employed as above in treating cloth. The treated cloth was dried for 10 minutes at 140° C. and rated for water repellency. The rating for oil repellency was based on failure of penetration of mixtures of mineral oil and heptane for 3 minutes. The ratings corresponding to the various percentages of heptane are:

| Percent heptane repelled: | Rating |
|---|---|
| 0 | 50 |
| 20 | 70 |
| 30 | 80 |
| 40 | 90 |
| 50 | 100 |

The results obtained were:

| | Cotton | Visa | Low acid wool | High acid wool |
|---|---|---|---|---|
| Spray rating | 50 | 100 | 80 | 90 |
| Oil rating | 90 | 100 | 90 | 80 |

A similar latex prepared using dodecyl trimethyl ammonium chloride as the emulsifier showed substantially similar results but was less effective in conferring water repellency.

Intermediate alcohols employed in the preparation of the compounds of the invention are provided as follows:

EXAMPLE 6

A mixture of 26.8 g. (0.052 mole) of perfluorooctanesulfonyl chloride and 5.0 g. (0.050 mole) of 4-pentenoic acid (allyl-acetic acid) is refluxed for four hours at about 120–145° C. in the presence of a catalytic amount (1.0 g.) of di-tertiary butyl peroxide. The reaction mixture is fractionally distilled under reduced pressure and the fraction boiling at about 100° C. at 0.01 mm. is collected. After recrystallization from a mixture of chloroform and carbon bisulfide, the 4-chloro-5-(perfluorooctyl)-pentanoic acid thus prepared melts at about 89–90° C.

The 4-chloro-5-(perfluorooctyl)-pentanoic acid thus prepared is hydrogenated by shaking a solution of 8.00 g. (0.0145 mole) of the acid and 2.5 g. (0.062 mole) of sodium hydroxide in a mixture of 30 ml. of water and 30 ml. ethanol for 3 hours at 140° C. in a rocking high-pressure hydrogenation apparatus, in the presence of 4 g. of Raney nickel catalyst and with hydrogen supplied at 2500 p.s.i. pressure. After removal of the catalyst and evaporation to dryness, an amorphous residue is obtained comprising sodium 5-(perfluorooctyl)-pentanoate. By dissolving this residue in water followed by acidification of the resulting solution, the saturated perfluoroalkyl aliphatic acid formed by hydrogenation is recovered as a waxy white solid, which can be distilled at 100° C. at 0.02 mm. pressure. After recrystallization from carbon bisulfide, the 5-(perfluorooctyl)-pentanoic acid thus prepared melts at about 86.5–87.3° C. The procedure described in U.S. Patent 2,666,797, using lithium aluminum hydride, is employed for reduction of the acids to the corresponding alcohols. A suspension in ether of 30 parts of 5-(perfluorooctyl) pentanoic acid is added to a solution of 3 parts of lithium aluminum hydride in about 200 parts of anhydrous ether. The reaction mixture is stirred for about 48 hours and then is treated with water and neutralized with sulfuric acid. The reaction mixture is extracted several times with ether, and the ether extracts are combined, dried and fractionally distilled in vacuo. There is obtained 5-(perfluorooctyl)-pentanol boiling at about 108° C. at 2.5 mm. pressure of mercury.

In the same way, using 10-undecenoic acid in preparation of the perfluoro acid instead of allyl-acetic acid, there is produced 11-(perfluorooctyl)-undecanoic acid, which on reduction yields 11-(perfluorooctyl)-undecanol boiling at about 122–126° C. at 0.10–0.15 mm. pressure of mercury.

By repeating the foregoing procedure, employing perfluoro-n-pentanesulfonyl chloride and perfluorododecanesulfonyl chloride (prepared by the process of Brice et al. as disclosed in U.S. Patent No. 2,732,398) instead of perfluorooctanesulfonyl chloride, there are obtained, respectively, 5-(perfluoropentyl)-pentanoic acid and 5-(perfluorododecyl)-pentanoic acid. Likewise, when 3-butenoic acid, 6-heptenoic acid and 10-hendecenoic acid are employed instead of 4-pentenoic acid in carrying out the procedure of this example, there are obtained, respectively, the corresponding 4-(perfluorooctyl)-butyric acid, 7-(perfluorooctyl)-heptanoic acid and 11-(perfluorooctyl) hendecanoic acid. Upon reduction, these acids yield the corresponding 5-(perfluoropentyl)-pentanol, 5-(perfluorododecyl)-pentanol, 4-(perfluorooctyl)-butanol, 7-(perfluorooctyl)-heptanol and 11-(perfluorooctyl)-hendecanol, respectively.

Perfluoroalkyl-substituted propanols can be prepared by the method exemplified as follows: to a mixture of 80 g. of perfluorooctyl sulfonyl chloride and 31 g. of allyl acetate are added about 3 g. of di-tertiary butyl peroxide and the reaction mixture is slowly heated to about 80° C., whereupon a spontaneous rise in temperature to about 130° C. occurs. After this reaction is over there is added a further amount of the di-tertiary butyl peroxide. Heating is continued for about 14 hours at about 110° C. with a further addition of peroxide after about 8 hours of heating. The reaction mixture is then fractionally distilled in vacuo, and the 2-chloro-3-(perfluorooctyl) allyl acetate which is formed in the reaction is recovered, as a fraction boiling at about 153–158° C. at 37 mm. pressure. To a solution of 50.5 g. of this substance in 50 ml. of anhydrous methanol containing phenolphthalein indicator is added slightly more than the theoretical amount of sodium methylate in methanol solution. The reaction mixture becomes slightly pink and sodium chloride is precipitated. After standing about 48 hours at room temperature, the reaction mixture is treated with about 10 ml. of water and an additional amount of sodium methylate, and then warmed to about 50° C. for about 4 hours. The organic phase is then removed and fractionally distilled, the fraction boiling over the range 129–141° C. at 37 mm. pressure of mercury being recovered. The 3-(perfluorooctyl) allyl alcohol thus prepared has index of refraction $n_D^{23}=1.3328$. A mixture of 42 g. of 3-(perfluorooctyl) allyl alcohol, 1.8 g. of Raney nickel, 45 ml. of ethanol and 1 g. of potassium hydroxide is charged to an autoclave and hydrogen under about 150 atmospheres' pressure is introduced. Hydrogenation to the corresponding saturated alcohol takes place as evidenced by a drop in pressure over a period of about an hour. The contents of the autoclave are removed, filtered and the filtrate is fractionally distilled in vacuo. There is obtained 3-(perfluorooctyl)-propanol, which boils at about 138–143° C. at 38 mm. pressure and has index of refraction $n_D^{24}=1.3312$. The infra-red spectrogram of this substance indicates that it is completely saturated.

3-(perfluoropropyl)-propanol is prepared starting with ethyl perfluorobutyrate as follows: Approximately equimolar quantities of ethyl perfluorobutyrate, methyl acetate and sodium methoxide are used. The ethyl perfluorobutyrate is added to a cooled solution of sodium methoxide in absolute ether, with continued cooling. After stirring this mixture for approximately two hours the methyl acetate is added, whereupon a clear solution forms. The solution is stirred for approximately 16 hours and then fractionally distilled under reduced pressure, to remove solvents and to obtain methyl 3-(perfluoropropyl)-3-keto propionate as the main product. The keto-ester thus obtained is hydrogenated under pressure with Raney nickel catalyst, in ether solution, under the usual conditions, for about two hours. The catalyst is removed by filtration and the filtrate is fractionally distilled in vacuo, whereupon methyl-3-(perfluoropropyl)-3-hydroxy propionate is recovered, boiling at about 85° C. at 15 mm. pressure and having refractive index $n_D^{25}=1.3513$. About 157 parts of the hydroxy ester thus obtained and 175 parts of phosphorous pentoxide are mixed and allowed to stand for approximately 16 hours (a rather strong exothermic reaction being noted shortly after mixing). The reaction mixture is then filtered and the filtrate is purified by fractional distillation. There is obtained methyl-3-(perfluoropropyl) acrylate which boils at 121–124° C. at 732 mm. pressure and has refractive index $n_D^{25}=1.3362$. The acrylic ester is hydrogenated in ether solution using Raney nickel catalyst and high pressure under the usual conditions. The reaction mixture is filtered and the filtrate is fractionally distilled under reduced pressure. There is obtained the corresponding saturated ester, methyl 3-(perfluoropropyl) propionate, which boils at 42° C. at 12 mm. pressure and has refractive index $n_D^{25}=1.3276$. To a solution of 7.6 g. (.2 mole) of lithium aluminum hydride in 500 ml. of ether are added 49 g. (0.191 mole) of the methyl-3-(heptafluoropropyl)-propionate dissolved in 100 ml. of ether, at such a rate that vigorous refluxing is maintained. The mixture is then stirred for 1 hour and an excess of methanol is added to hydrolyze the complex. The reaction mixture is next acidified with dilute sulfuric acid. The ether layer is separated and the aqueous layer is further extracted with about an equal volume of ether. The combined ether phases are evaporated to remove the ether and the residue is fractionally distilled. The 3-(heptafluoropropyl)-propanol thus obtained boils at about 140–141° C. at 745 mm. pressure and has index of refraction $n_D^{24}=1.3270$.

What is claimed is:

1. Polymers having a skeletal chain containing recurring perfluoroalkyl acrylate ester units represented by the formula:

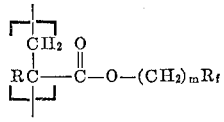

wherein R is a member of the group consisting of hydrogen and the methyl radical, $R_f$ is a perfluoroalkyl radical having from 3 to 12 carbon atoms and $m$ is an integer from 3 to 12.

2. A process for the preparation of a fluorocarbon polymer which comprises polymerizing in the presence of an effective amount of free radical generating catalyst a perfluoroalkyl-alkyl acrylate having the formula:

$$R_f\!-\!(CH_2)_m\!-\!O\!-\!CO\!-\!C(R)\!=\!CH_2$$

wherein R is a member of the group consisting of hydrogen and methyl, $R_f$ is a perfluoroalkyl radical having from 3 to 12 carbon atoms and $m$ is an integer from 3 to 12, in an aqueous vehicle.

3. A process for producing a polymeric latex from a monomer which may be represented by the formula:

$$R_f\!-\!(CH_2)_m\!-\!O\!-\!CO\!-\!C(R)\!=\!CH_2$$

wherein R is a member of the group consisting of hydrogen and methyl, $R_f$ is a perfluoroalkyl radical having from 3 to 12 carbon atoms and $m$ is an integer from 3 to 12, which comprises agitating an aqueous medium containing said monomer in dispersed form together with a water-soluble free radial initiator and an emulsifying agent, until an amount of the monomer is polymerized.

4. A polymer according to claim 1 wherein R is hydrogen, $R_f$ is $C_3F_7\!-$ and $m$ is 3.

5. A polymer according to claim 1 wherein R is hydrogen, $R_f$ is $C_8F_{17}\!-$ and $m$ is 3.

6. An aqueous latex suitable for rendering fibrous materials oil repellent, containing a polymer having a skeletal chain containing recurring perfluoroalkyl acrylate ester units represented by the formula:

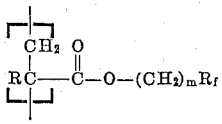

wherein R is a member of the group consisting of hydrogen and the methyl radical, $R_f$ is a perfluoroalkyl radical having from 3 to 12 carbon atoms and $m$ is an integer from 3 to 12.

7. A textile fabric which has been sized with an aqueous latex containing a polymer having a skeletal chain containing recurring perfluoroalkyl acrylate ester units represented by the formula:

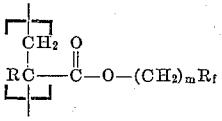

wherein R is a member of the group consisting of hydrogen and the methyl radical, $R_f$ is a perfluoroalkyl radical having from 3 to 12 carbon atoms and $m$ is an integer from 3 to 12, so as to have been rendered oil repellent.

8. Fibers coated with a polymer having a skeletal chain containing recurring perfluoroalkyl acrylate ester units represented by the formula:

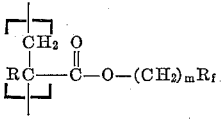

wherein R is a member of the group consisting of hydrogen and the methyl radical, $R_f$ is a perfluoroalkyl radical having from 3 to 12 carbon atoms and $m$ is an integer from 3 to 12, so as to have been rendered oil repellent.

References Cited in the file of this patent

UNITED STATES PATENTS

| | | |
|---|---|---|
| 2,642,416 | Ahlbrecht et al. | June 16, 1953 |
| 2,831,033 | O'Rear | Apr. 15, 1958 |